(12) United States Patent
Fahrenbach et al.

(10) Patent No.: US 6,393,909 B1
(45) Date of Patent: May 28, 2002

(54) FLUID LEVEL MEASURING DEVICE MEASURING FLUID LEVEL IN A CONTAINER AT HIGH TEMPERATURES AND/OR HIGH PRESSURES AND/OR IN A CHEMICALLY AGGRESSIVE ENVIRONMENT USING MICROWAVES

(75) Inventors: Josef Fahrenbach, Haslach; Jürgen Motzar, Offenburg; Jürgen Dietmeier, Hausach; Günter Rapp, Wolfach, all of (DE)

(73) Assignee: VEGA Grieshaber XG (DE)

( * ) Notice: Subject to any disclaimer, the term of this patent is extended or adjusted under 35 U.S.C. 154(b) by 0 days.

(21) Appl. No.: 09/271,819

(22) Filed: Mar. 18, 1999

(30) Foreign Application Priority Data

Mar. 18, 1998 (EP) .............................................. 98104932

(51) Int. Cl.[7] ................................................ G01F 23/00
(52) U.S. Cl. ................... 73/290 V; 73/290 R; 333/252
(58) Field of Search .......................... 73/290 R, 290 V, 73/291, 295, 299, 301

(56) References Cited

U.S. PATENT DOCUMENTS

| | | | |
|---|---|---|---|
| 4,495,807 A | 1/1985 | Field et al. | ................... 73/290 |
| 4,566,321 A | * 1/1986 | Zacchio | ..................... 73/290 R |
| 4,833,918 A | * 5/1989 | Jean et al. | ................. 73/290 V |
| 5,279,156 A | 1/1994 | van der Pol | ................... 73/290 |
| 5,565,067 A | * 10/1996 | Chaffin, III | ................... 203/10 |
| 5,851,083 A | * 12/1998 | Palan | ......................... 403/337 |
| 5,872,494 A | * 2/1999 | Palan et al. | ................... 333/252 |
| 5,877,663 A | * 3/1999 | Palan et al. | ................... 333/252 |
| 6,155,112 A | * 12/2000 | Eckert et al. | ............. 73/290 V |

FOREIGN PATENT DOCUMENTS

| | | | | |
|---|---|---|---|---|
| DE | 4327333 A1 | 2/1995 | ........... | G01F/23/28 |
| DE | 4405855 A1 | 8/1995 | .......... | H01Q/13/24 |
| EP | 0444834 A2 | 9/1991 | ........... | G01F/23/28 |
| EP | 0780664 A2 | 6/1997 | ......... | G01F/23/284 |
| WO | 97/12211 | 4/1997 | ......... | G01F/23/284 |

* cited by examiner

*Primary Examiner*—Hezron Williams
*Assistant Examiner*—Katina Wilson
(74) *Attorney, Agent, or Firm*—Schwegman, Lundberg, Woessner & Kluth, P.A.

(57) ABSTRACT

The invention concerns a microwave level measuring device for measuring of material levels in containers, suitable for operation at extreme container conditions, comprising high temperatures, high pressures, and/or chemically aggressive substances.

56 Claims, 11 Drawing Sheets

FLUID LEVEL MEASURING DEVICE MEASURING FLUID LEVEL IN A CONTAINER AT HIGH TEMPERATURES AND/OR HIGH PRESSURES AND/OR IN A CHEMICALLY AGGRESSIVE ENVIRONMENT USING MICROWAVES

FIELD OF THE INVENTION

The invention deals with the touch less measuring of material levels in containers by use of microwave measuring technology, and, in particular, with a microwave level measuring device for performing such measurements under extreme conditions, like at high temperatures, and/or at high pressures, and/or in the presence of chemically aggressive substances.

BACKGROUND OF THE INVENTION

A number of different measuring principles and devices derived from them are used for measuring the filling levels of materials in containers. Until now, for containers with extreme measuring conditions, like unusually high temperatures, and/or unusually high pressures, or chemically aggressive substances, direct material contact techniques were used exclusively for the measuring of levels, such as capacitive and hydrostatic measuring, as well as the combined measuring of in- and outflows.

In capacitive measuring systems, material, container, and measuring probe form an electrical condenser. Here, the filling level is determined by measuring the condenser capacitance. Generally, such capacitive probes cannot be used universally, but must be exclusively designed for a special application. For electrically conductive materials, depending on the material being measured, and the pressure, and temperature at which it is being stored, special insulating materials must be chosen for the probe. Moreover, if the measured materials stick to the probe, the latter must be coated with substances which neutralize adhesion.

In contrast, hydrostatic measuring methods determine material levels by measuring their hydrostatic pressures. However, this approach is only suitable for materials with fluid to paste consistency. Solid or highly viscous materials are not suitable for hydrostatic measuring.

Combined in- and outflow measurements generally permit no more but coarse estimates of the level of flowable materials by determining the quantity of the material in the container by measuring the difference between the quantity of material poured in and the quantity drained out. Capacitive measuring probes, hydrostatic pressure measurement converters, and flow measuring devices are all manufactured and distributed by the assignee of the present application.

Level measuring devices corresponding to the state-of-the-art often have the disadvantage of requiring contact of the measuring probe with the material to be measured. This results in a number of difficult technical problems, which leads to relatively high and, therefore, expensive manufacturing costs, even for devices that are used for less demanding conditions.

SUMMARY OF THE INVENTION

To avoid the disadvantages of limited application to certain filling materials and the corresponding high cost, it would be highly desirable to have a no-contact level measuring probe based on a measuring method that is practically suitable for all fluent filling materials as well as for operation in extreme measuring conditions.

The task of the invention is to create a measuring device based on a measuring method where there is no direct contact with the material where the device can be practically used determine the material level in containers of any material, even under extreme measuring conditions, like high temperatures, and/or high pressures, and/or the presence of aggressive chemical substances.

The present invention solves the problem by providing a level measuring device that determines the material level with no direct contact of the material, by timing the interval between an emitted and, after reflection from the material surface, a returned microwave signal, using suitable devices, for operation at high temperatures, and/or high pressures, and in presence of aggressive chemical substances.

An especially advantageous design of the invention provides for the operation of the level measuring device at temperatures above 300° C., and at pressures above 35 bar.

Commonly available level measuring devices based on interval timing of a microwave signal are not suitable for operation at such extreme conditions. The fundamental design and mode of functionality of such a known, state-of-the art measuring device, is approximately the following:

Control of the sending/receiving process, as well as the evaluation of the returned signal, occurs in a central control and measuring unit, generally implemented, in practice, by an electronic unit contained in the housing. The sent and returned signals are reciprocally transmitted by an electrical line, like a coaxial cable, that connects the sending/receiving unit with the electronic unit. The sending/receiving unit for sending and receiving the microwave signal consists of a horn antenna with an antenna feeder and a horn. The antenna feeder consists of a filled waveguide coupled with the microwave signal by an exciter pin. The transition from the filled waveguide to the horn is electrically adapted by a linear taper element. For determination of the material level, the microwave signal reflected from the surface of the filling material is subsequently received by the antenna and transmitted to the central control and measuring unit by the electrical cable. The device is installed on the container by a mounting unit, in most cases with a mounting flange that is rigidly connected to the container. Generally, the part of the mounting unit or assembly comprising horn, taper, and waveguide, is freely exposed to the conditions in the container. In the customary design, in which e.g. the waveguide filling material is sealed to the waveguide by an elastomer seal, there is no pressure sealing or pressure proofing against high container pressures. Moreover, the measuring device, especially its sensitive measuring and electronic control unit, is exposed to high container temperatures by the mounting unit. Without special provisions for protection against damaging influences, known microwave level measuring devices cannot be used for extreme container conditions.

To operate a common microwave level measuring device in extreme measuring conditions, the invention provides special devices and design modifications that insulate the sensitive device components against potentially destructive container conditions. These devices provide for pressure sealing and pressure proofing against high container pressures and protection against high container temperatures, as well as protection against chemically aggressive substances. This especially protects the sensitive measuring and electronic control, as well as the sending and receiving unit against damaging influences.

The devices for pressure proofing and pressure sealing enable the container pressure to act on the taper element, and is absorbed by the filling material of the waveguide. The waveguide is tightly connected with the mounting unit, especially with the mounting flange, preferably welded to it, so that the pressure force acting on the taper element is transmitted by the waveguide to the mounting flange.

Moreover, the devices for pressure proofing and pressure sealing provide protection against chemically aggressive substances.

Significant performance losses, possibly in connection with disturbances in the microwave transmission, like undesirable reflections, also referred to as "ringing", through strong changes in impedance, and similar symptoms do not occur with the devices manufactured in accordance with the present invention.

In a preferred design version of the invention, the housing connection between electronic unit and mounting flange is extended into a spacer tube, separating both components for thermal shielding against high container temperatures. The temperature gradient along the spacer tube and the spatial separation both achieve thermal shielding of the components. As material for the spacer tube, a metal, such as stainless steel, preferably, is provided.

In an advantageous design of the invention, at least one transverse separating wall is provided for thermal protection by dividing the spacer tube into separate, thermally isolated sections. A material with especially low heat conductivity, preferably Teflon, is provided as material for the separation wall. This design element provides further enlargement of the temperature gradient between device components on both sides of the spacer tube. Not only does this prevent direct heat conductance along the wall of the spacer tube, but it also prevents heat conductance inside of the spacer tube (by convection, radiation etc.). This also makes it possible to arrange the heat sensitive device components inside of the spacer tube in the thermally isolated, cooler sections of the spacer tube.

A further invention design provides an air filled coaxial cable for thermal insulation of heat sensitive components as part of the electrical line between electronic unit and waveguide. The coaxial cable enables wide-band transmission of sending/receiving signals under extreme thermal conditions. Interior and exterior conductor of the coaxial cable are preferably made from metal. In contrast, common high frequency cables cannot be used at high temperatures (above 300° C.). Preferably, the coaxial cable is designed so that its microwave pulses interface directly with the coupling piece of the waveguide via an exciter pin. Here it is especially preferred that the thermally insulating separation wall inside the spacer tube be located near the connection of the electrical line coming from the electronic unit with the coaxial cable leading to the taper; thus providing for an advantageous formation of a thermal separator inside of the spacer tube, approximately at the location of the transition into the coaxial cable.

According to the invention, for connecting the waveguide filling to the waveguide, at least part of the waveguide filling is made from heatproof, microwave permeable material, preferably glass. This makes it possible, by use of customary melting, welding, and soldering methods, to achieve a pressure proof or pressure sealing melt, weld, or solder fusion of the glass with the surrounding metallic tube even at high pressures without prior metalization of the waveguide filling.

This may be, but does not have to be, provided together with individual or all of the above mentioned devices of the invention.

Aside from devices for the thermal insulation of heat sensitive device components, other pressure proof devices are provided by the invention, for high-grade pressure sealing, and sealing against chemically aggressive substances. These devices comprise fundamentally all suitable sealing materials, which can be arranged to result in axial and/or radial sealing. Especially suitable for this purpose are metal seals, graphite seals, and similar means. The sealing effect is here preferably accomplished by a pressure screw pressing on the sealing material. Additional elements may be put between a pressure screw and a pressure seal to prevent twisting of the pressure seal when tightening the pressure screw. However, ordinary wielding connections may also be used for pressure proof sealing of the connections between adjacent device components, like between waveguide and mounting flange, or spacer tube and mounting flange. Here, the weld seam extends about 1 mm into the connecting gap.

In the following specification, five alternative embodiments of the invention are presented, which illustrate the above devices for thermal shielding against high container temperatures, as well as sealing materials for sealing against container pressure and chemically aggressive substances. The first three preferred design versions differ by the utilization of different devices used for attachment of the waveguide filling in the waveguide. The next preferred design version is characterized by the spacer tube being a waveguide. Finally, the fifth preferred design version is characterized by a polyrod antenna instead of a horn antenna. Although not described here, it is evident from the following description that the individual features of these alternative design versions or embodiments can be combined into new ones.

For pressure absorption of the container pressure on the taper, a first preferred design version provides a pressure proof weld, solder, melt, or something similar, of the waveguide filling with the waveguide by known techniques. The waveguide may contain additional connecting elements, like soldering or welding sleeves, which are in turn attached pressure proof to the waveguide. In an advantageous design version, the. soldering or welding sleeve consists of two parts, with one part of a material having a heat expansion coefficient corresponding to that of the waveguide filling. To prevent corrosion of the welding seams, a seal against chemically aggressive substances is, preferably, arranged in axial direction between the connecting seam and the container interior.

Also for pressure absorption of the container pressure on the taper, another preferred design version provides for thermal press-molding of the waveguide filling to the waveguide jacket. In this case, the waveguide jacket is shaped such that the contact area with the taper is sufficiently large to guarantee a pressure proof press-mold. According to the invention, thermal press-molding of the taper with the waveguide jacket can be provided without additional elements partaking in press-molding. A layer of ductile material, preferably gold, may be placed between the two components to be pressed together. According to the invention, temperatures and materials for the taper and waveguide jacket are selected for thermal press-molding, so that the pressing remains stable even at high temperatures, especially at temperatures above 300° C. An especially preferred material for the waveguide jacket is VA steel.

In an alternative design, additional elements for fixation of the press-molding make it possible to perform press-molding at relatively low temperatures, especially also at room temperatures. By means of these additional elements, the press-mold remains stable at extremely high container pressures, although press-molding occurred at relatively low temperatures. A significant feature of these additional elements, which fixate the press-molding, is that their material has a lower heat expansion coefficient than the material of the waveguide jacket. This protects the press-molding during heating with high container temperatures, because the additional element has lower heat expansion. Especially preferred is a heat expansion coefficient of the additional element material, which is similar to the waveguide filling. This version provides for two different, equally preferred variations, in which the additional fixation element is either put into the press-molding between waveguide filling and waveguide jacket, or surrounds the waveguide filling at the location of the press-molding. If the additional fixation element is placed between waveguide filling and waveguide jacket, an alloy like Hastealloy is provided as an especially preferred material. However, if the additional element surrounds the location of the press-molding, an alloy like Vacon 70 is especially preferred as material.

Another preferred version of the invention provides for enlargement the waveguide filling at the taper to absorb and better distribute the container pressure. Here, the broader part of the waveguide filling is supported in axial direction of the waveguide filling by a sufficiently stable support base, especially in shape of a pressure ridge. The pressure ridge may be formed by a pressure screw and a further element, especially an additional pressure ring. Through the threaded connection with the building component, preferably with the waveguide jacket, the pressure screw provides a sufficiently stable support for the wider part of the waveguide filling at the pressure ridge, even at extremely high container pressures. To secure pressure proofing or sealing not only for the enlargement of the waveguide filling and the pressure ridge, but also pressure proofing against container pressure, suitable sealing materials are put between the enlargement and the container interior. Especially preferred as seal is a graphite ring, a graphite seal of the "Spiralterm" type, or a metal seal of the "Helicoflex" type. Here, the pressure effect on the seal is preferably transferred through the enlarged part of the waveguide filling, or by aid of a pressure ring. Furthermore, especially preferred is a waveguide filling enlargement that corresponds in its axial direction to half the wavelength of the transmitted microwave. By shaping the wider part as a lambda/2-transformation layer, performance losses of the microwave transmission by reflections on the enlargement is avoided in an advantageous manner by compensating the reflection at one jump in impedance change at a second jump in impedance change.

A further version of the invention does not only provide for the spacer tube to achieve a spatial and thermal separation of the connected device components, but also serves as an air-waveguide for transmission of the microwaves. Inside of the spacer tube functioning as a waveguide, preferably for thermal shielding of heat sensitive device components, a separating wall permeable to microwaves is provided, which is made from low heat-conducting material, preferably from Teflon. With exception of the coaxial line, all of the above mentioned devices can also be used for thermal shielding against high container temperatures, for sealing against high container pressures, as well as sealing against chemically aggressive substances. Advantageously, in this version, no cable or line connections are required for transmission of the microwave pulses in the spacer tube.

A further version of the invention provides for a use of a known polyrod antenna instead of a horn antenna for sending microwaves into the container. The devices for thermal shielding against high container temperatures, pressure sealing and pressure tightness against high container pressures, as well as against aggressive chemical substances between antenna rod (which is here provided instead of the taper), and its mount etc., are shaped analogously to the prior design versions. This embodiment is suitable for the material level determination through small openings.

With exception of the embodiment where the spacer tube functions as an air-waveguide, coupling of the microwaves to the waveguide filling occurs for all design versions either sideways, i.e. along the axial length of the waveguide filling, or from behind, i.e. at the side away from the taper, preferably, however, sideways. By coupling from the side, the sidewise position of the exciter pin is achieved in a specially preferred manner by a tangential bend of the coaxial line.

DETAILED DESCRIPTION OF THE VARIOUS EMBODIMENTS

In the figures, the same device elements are given analogous reference indicators.

Figure 1A:
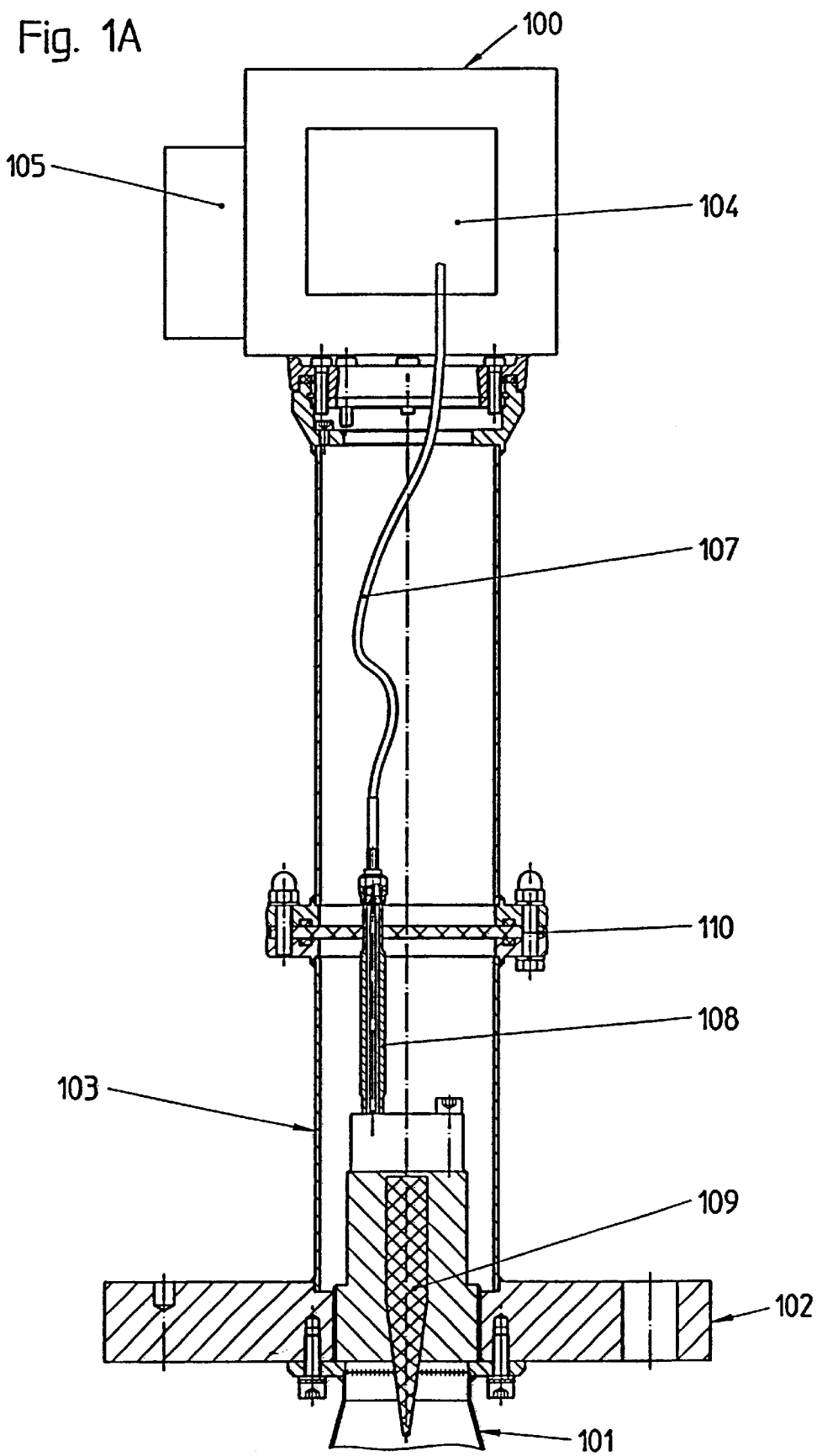
FIG. 1A is a schematic overview diagram of an embodiment of the level measuring device.

FIG. 1A is a schematic overview diagram of an embodiment of the level measuring device which may be mounted on a wall of a container at a measurement hole therethrough. The microwave level measuring device consists of a control/measuring unit 100, a sending/receiving or antenna unit 101, a mounting unit or a mounting assembly 102, and a steel spacer tube 103 connecting control/measuring unit 100 with sending/receiving unit 101. Control/measuring unit 100 consists of a housing with an electronics package 104 and a terminal box 105. Control/measuring unit 100 provides especially for the control of the microwave signal sending/receiving process, as well as for the subsequent evaluation of the received microwave signals in order to measure the distance to the surface of fluent material to measured.

In spacer tube 103, there is an electrical line, consisting of a cable 107 and an air insulated coaxial line 108 for communication or alternating transmission and reception of microwave pulses between control unit 100 and sending/receiving unit 101. Coupling of the microwave signals or pulses occurs by a waveguide filling medium or insert 109. Near the connection of cable 107 with the coaxial line 100, a thermal barrier comprised of at least one separation wall 110 is formed from a suitable insulating material such as Teflon and is arranged in spacer tube 103. This provides for the thermal shielding of heat sensitive device elements of the electronics package 104 connected to the spacer tube 103 from the high temperatures that may be present within the container.

Figure 1B:
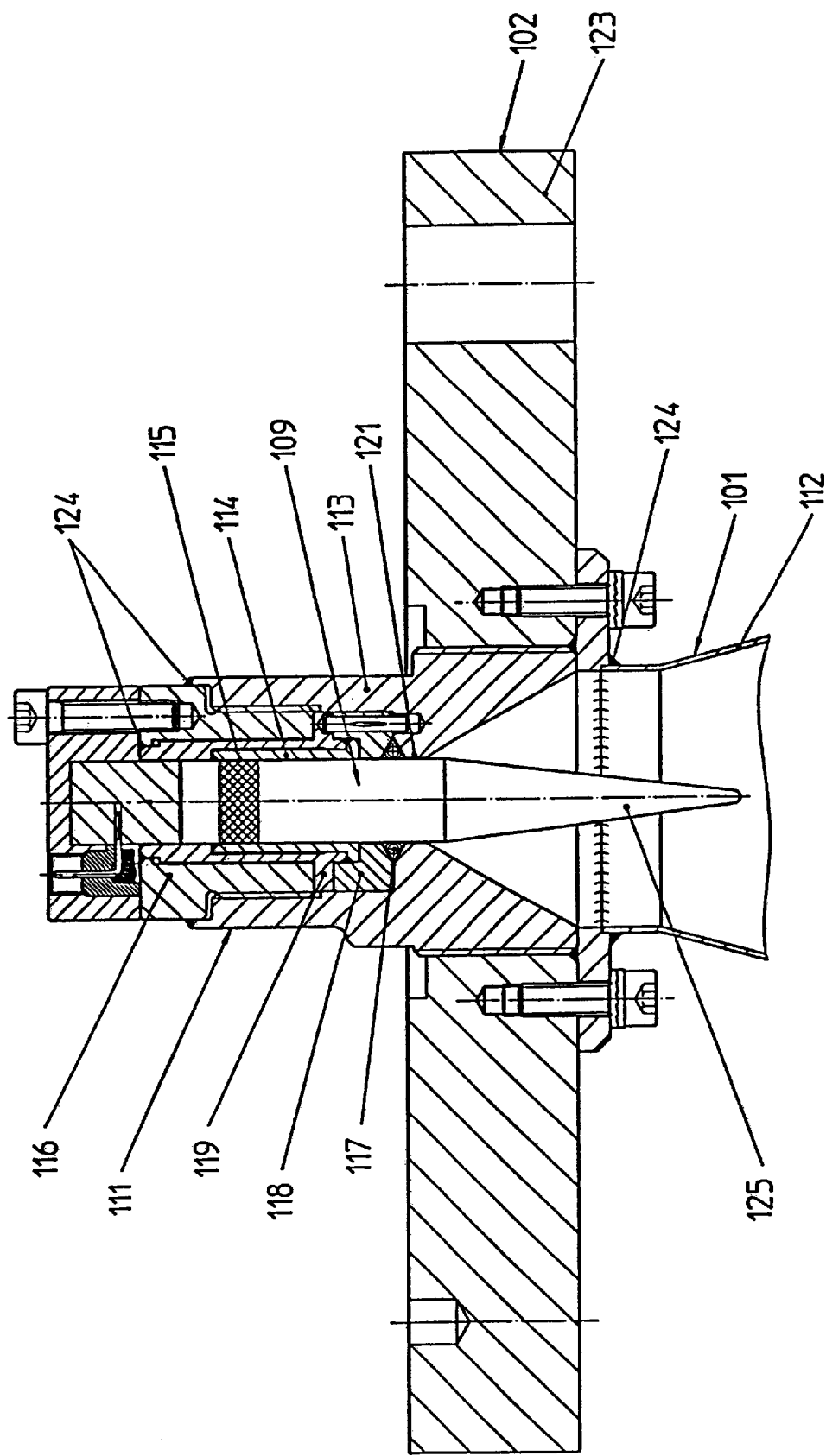
FIG. 1B shows an enlarged section of FIG. 1A with the sending/receiving unit of an embodiment of the level measuring device.

FIG. 1B shows, in a section of FIG. 1A, a further embodiment of the sending/receiving unit of a inventive microwave level measuring device. The wave guide filling medium or insert 109, a taper element 125, a waveguide 111, and a horn 112 are arranged in the sending/receiving unit 101 and the throat portion of horn 112 is mounted on a mounting assembly 102 having a mounting flange 123. The waveguide 111 consists of a waveguide jacket 113, a solder sleeve 114, a solder seam 115, a pressure screw 116, a metal seal 117, a pressure ring 118 and a disk 119 all of which cooperate for forming a tight seal of the measurement hole of the container from the interior of the spacer tube 103. For transmission of the microwave pulses or signals, the distal portion of waveguide filling 109, taper 125 which extends from waveguide filling 109, the lower portion of waveguide jacket 113, and horn 112 which is connected at its throat portion to waveguide jacket 113 are freely exposed to the interior of the container when flange 123 is secured to the wall of the vessel surrounding the measurement opening into which the bell portion of horn 112 is inserted.

The waveguide filling 109 is soldered into the solder sleeve 114 along a solder seam 115. Solder sleeve 114 is in turn fixed to the mounting assembly 102 by the waveguide jacket 113. With the use of pressure ring 118, metal seal 117 is shaped as a combined axial and radial seal. Sealing is achieved by a pressure screw 116 acting on metal seal 117 via disk 119 and pressure ring 118. The pressure screw receives the necessary counter pressure for the sealing effect by placement of the metal seal 117 on a pressure ridge 121 of waveguide jacket 113. Disk 119 prevents the twisting of metal seal 117 by arresting pressure screw 116. Pressure tight sealing of the waveguide filling 109 and waveguide 111 against extremely high container pressures is achieved by metal seal 117.

A circumferentially disposed band or solder seam 115 is formed on waveguide filling 109 so that the container pressure acting on the waveguide filling is absorbed by the solder seam, and transferred to the mounting assembly 102 via the fixed connection between solder sleeve 114 and waveguide jacket 113. The metal seal 117 also prevents corrosion of solder seam 115 by shielding it against chemically aggressive substances from the interior of the container.

Provided as materials for the waveguide filling 109 are preferably ceramic $Al_2O_3$, and preferably stainless steel is used for the waveguide 111.

Mounting assembly or mounting unit 102 consists of the mounting flange 123, which is attached to the container. Welding seams 124 between solder sleeve 114 and pressure screw 116, pressure screw 116 and waveguide jacket 113, waveguide jacket 113 and mounting flange 123, mounting flange 123 and spacer tube 103 (as can be best viewed in FIG. 1A), provide for mechanical locking and for pressure sealing against extremely high internal container pressures. The welding seams 124 are formed such that they extend sufficiently deep into the corresponding connection gap to provide a strong and pressure tight mechanical seal.

Figure 2A:
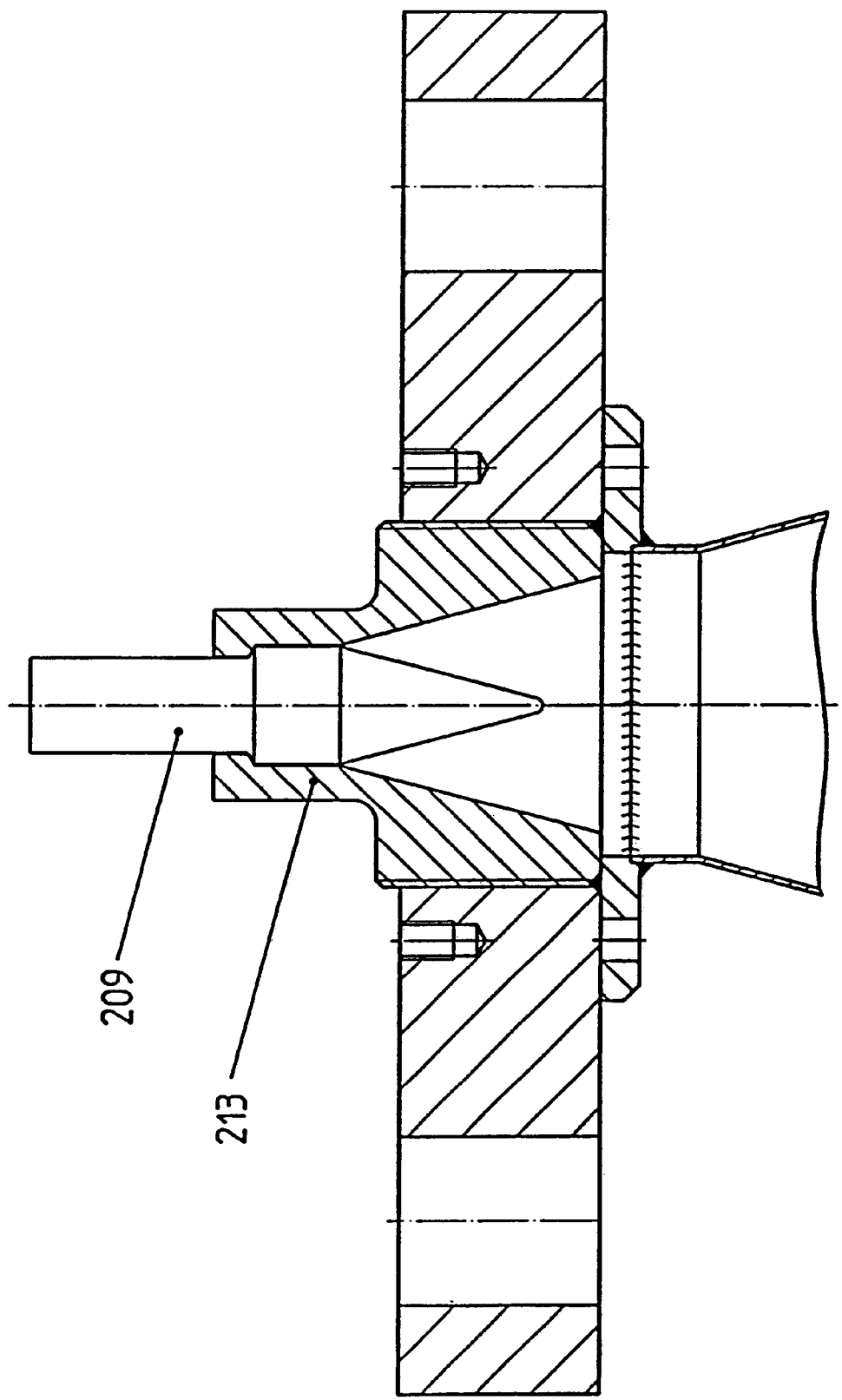
FIG. 2A, 2B, and C show three alternative embodiments of the level measuring device (thermal press-molding of the waveguide filling with the waveguide jacket).
Figure 2B:
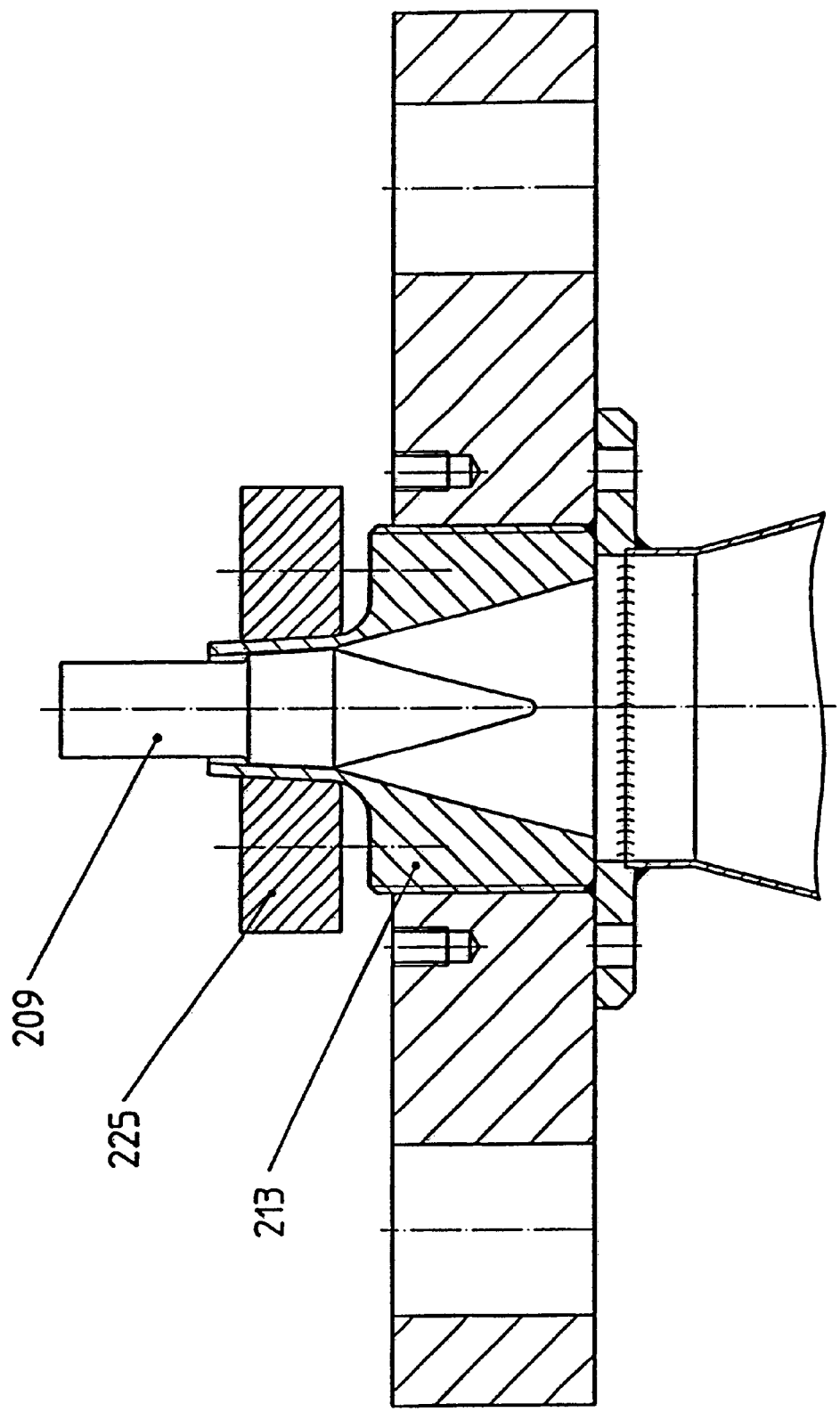
Figure 2C:
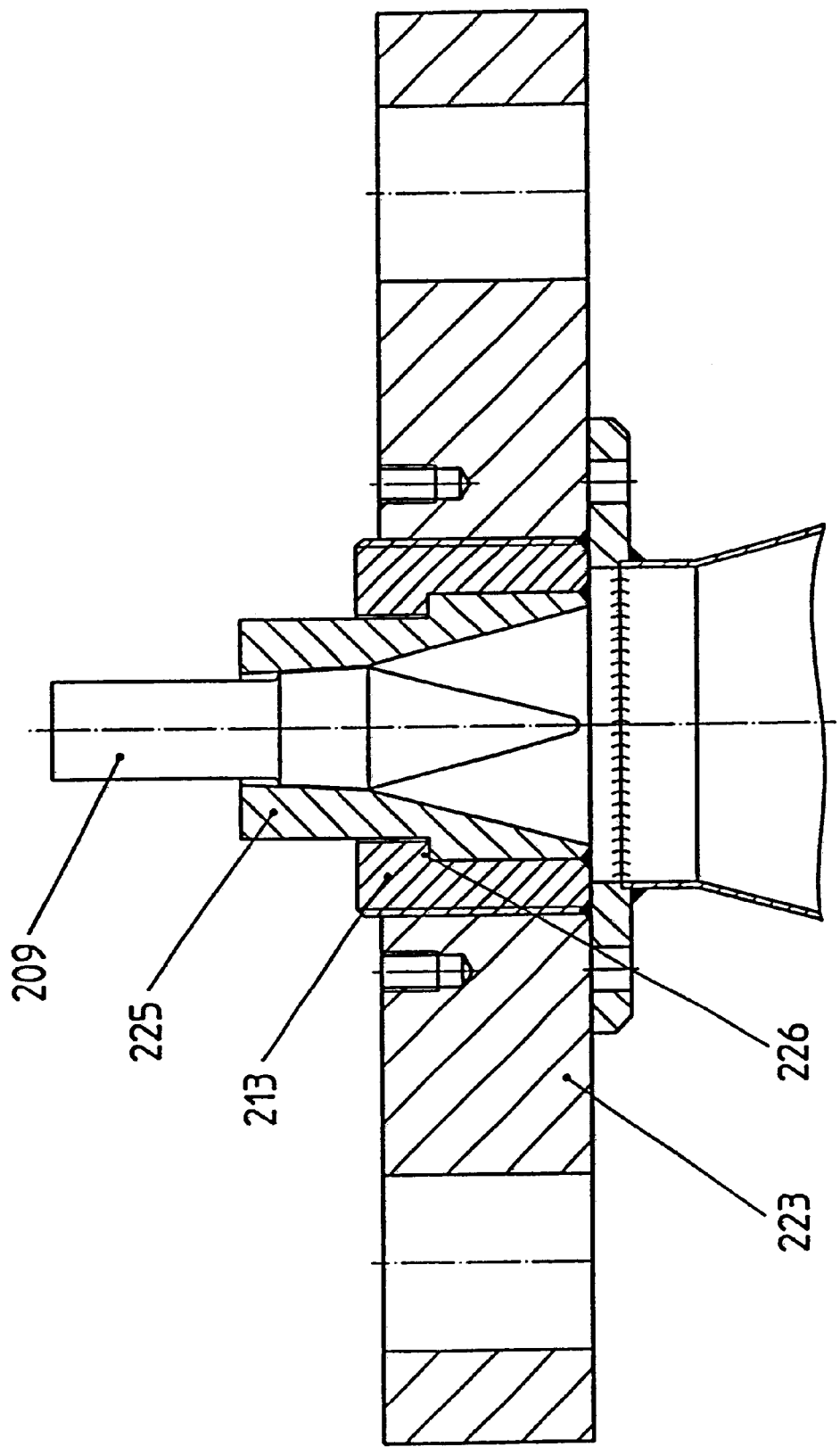

Also generally shown in FIG. 1B is a further protective cover portion 135 in which terminal 134 is mounted and provides signals from coaxial line 108 exciter pin 135 which couples the signals into the waveguide filling 109 for transmission by the taper portion 109 thereof FIG. 2A, 2B, and 2C show three alternative variations of a further design version of the invented level measuring device, with the waveguide filling press-molded to the waveguide filling for absorption of the container pressure at the taper.

FIG. 2A shows the thermal press-molding of the waveguide filling 209 with the waveguide that consists in this version of the waveguide jacket 213 only. The waveguide jacket is bound ring-shaped to the waveguide, forming a sufficiently large press-molded area with the waveguide filling for an adequately tight connection against high container pressures. The materials for the waveguide filling and waveguide jacket are chosen such that the pressmold resists high container temperatures even at very high container temperatures.

FIG. 2B shows a variation of the design version of FIG. 2A, in which the press-area is surrounded by an additional element, in this case consisting of a ring 225 of a thermally low expansion material.

Provided as material for the ring is an alloy, like Vacon 70.

Press-molding may also occur at low temperatures, especially also at room temperatures. The ring secures the press-molded area even at high container temperatures, although press-molding may be performed at low temperatures. The design of the waveguide jacket 213 respective to the press-molded area does not differ from prior variations.

FIG. 2C shows a variation of FIG. 2B with the significant difference of an additional element 225 consisting of a low expansion material that does not surround the press-molded area, but which is arranged between waveguide filling 209 and waveguide jacket 213.

Provided as material for the additional element 225 is an alloy, like Hastealloy.

Press-molding of this variation may also occur at low temperatures, especially at room temperatures. The additional element 225 also secures the press-molded area at high temperatures. The waveguide jacket is shaped such that pressure transfer may occur from the additional element 225. In particular, the pressure transfer occurs via a weld seam and a pressure ridge 226 formed on the waveguide jacket. The waveguide jacket is in turn tightly connected to the mounting flange 223 by a weld seam.

Figure 3A:
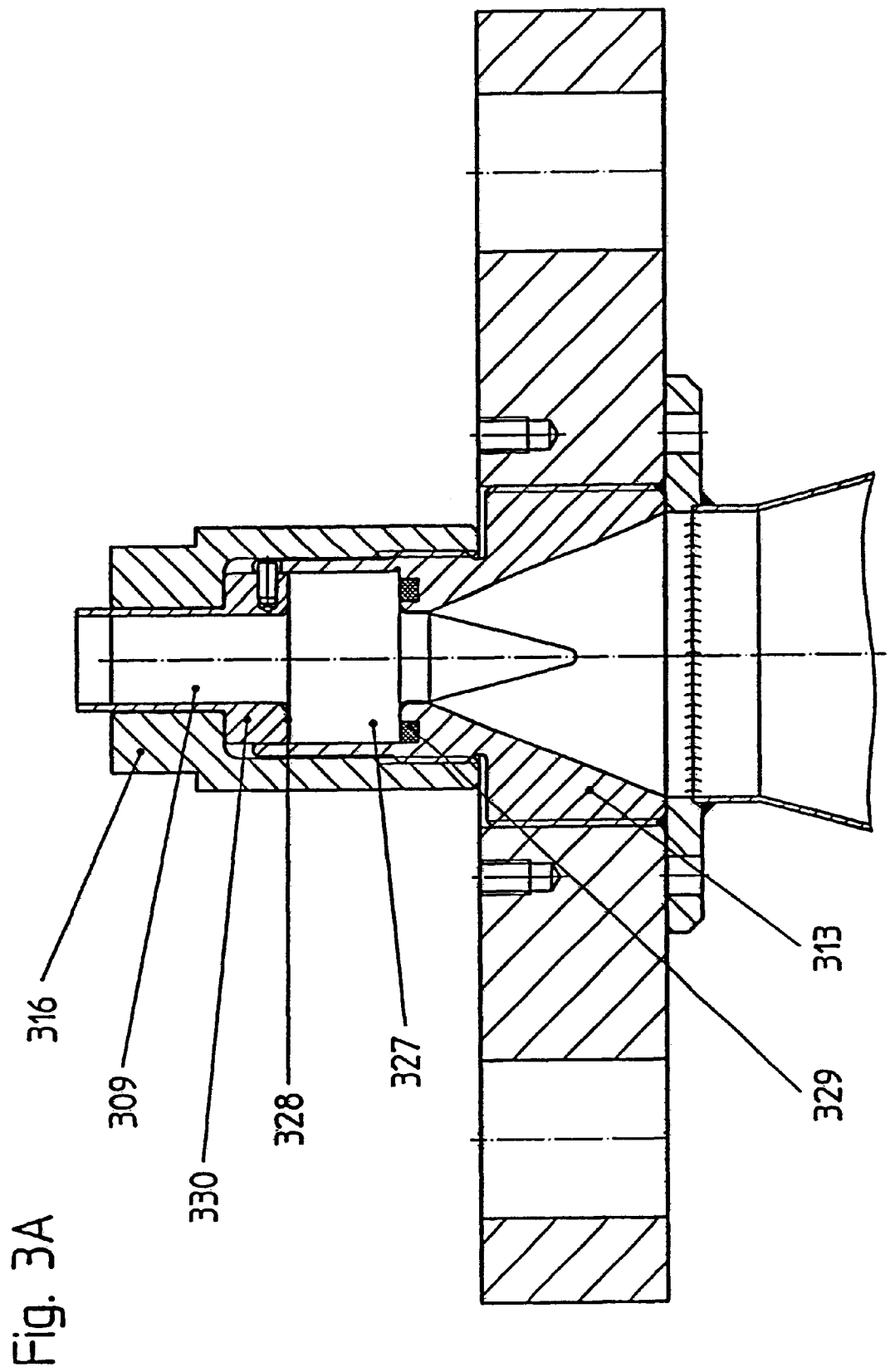
FIG. 3A, 3B show two variations of an alternative embodiment of the level measuring device (enlargement of the waveguide filling).
Figure 3B:
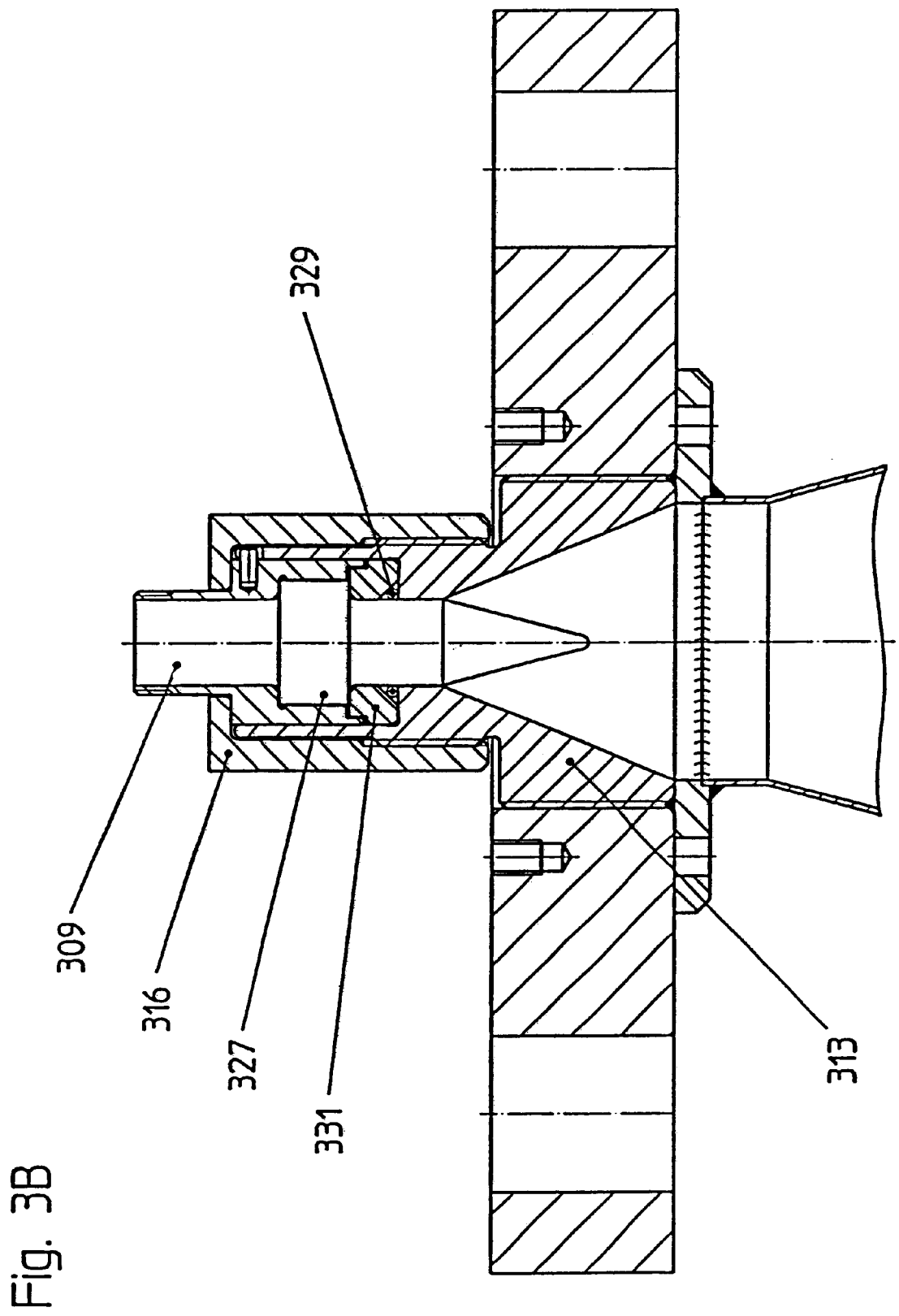

FIG. 3A and FIG. 3B show two variations of a further alternative design version of the invented level measuring device. This design version is significantly characterized by a enlargement 327 of the waveguide filling 309 formed as "lambda/2-enlargement". Both variations differ from another only by arrangement of the ring seals: while the ring seal is axially arranged in FIG. 3A, FIG. 3B is characterized by a combined axial/radial arrangement of the ring seal.

FIG. 3A shows, for purpose of pressure absorption on the waveguide filling, a lambda/2-enlargement 327 of the waveguide filling in combination with an axial ring seal 329. Pressure absorption on the waveguide filling occurs such that the waveguide filling is supported by the enlargement 327 in axial pressure direction of the waveguide filling by a pressure ridge 328. Here, the pressure ridge is formed by a pressure ring 330. A pressure screw 316 locks the pressure ring in its position. The pressure seal 329 provides for sealing against high container pressures and aggressive chemical substances. Provided for the ring seal is a graphite ring, a graphite seal of the type "Spiralterm", or a metal seal of the type "Helicoflex". The pressure screw 316 exerts a pressure effect on the sealing ring via the enlargement of the waveguide 327 filling. The pressure ring 330 prevents twisting of the sealing ring by locking the pressure screw. The sealing ring is arranged on a projection of the waveguide jacket in a manner that causes counter pressure to the pressure effect of the pressure screw.

FIG. 3B, as variation of the preceding FIG. 3A, shows a "lambda/2"-enlargement of the waveguide filling 327 in connection with a ring seal 329 in an axial/radial arrangement. In this variation, the pressure effect of pressure screw 316 on the ring seal is transferred by the enlargement of the waveguide filling 327 and by an additional pressure ring 331. The pressure ring is chamfered on its side towards the sealing ring in a manner that achieves an axial/radial sealing effect in connection with the counter pressure of the waveguide filling 309 and the waveguide jacket 313.

Figure 4:
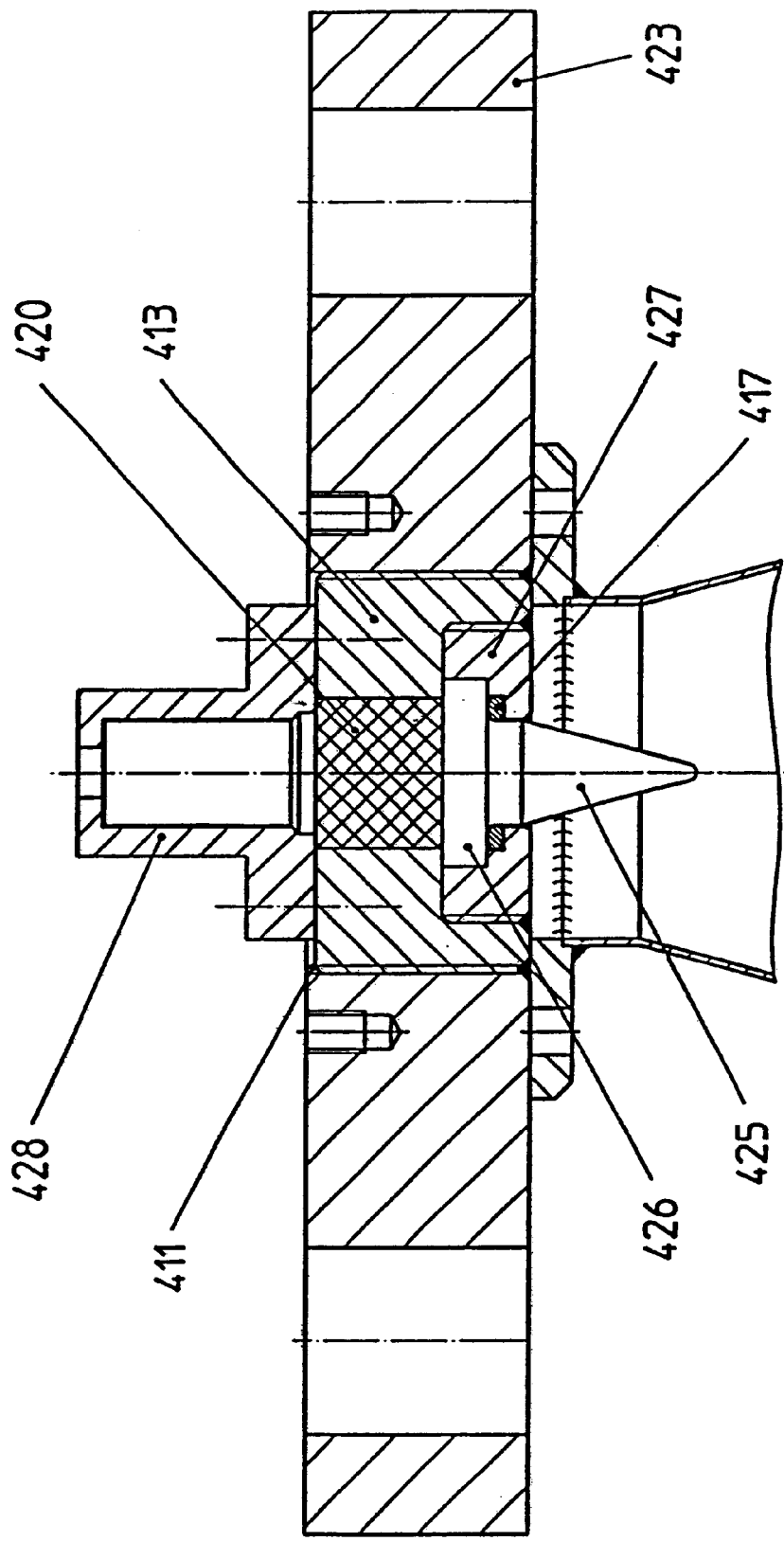
FIG. 4 shows a further embodiment of the FIG. 1 design version.

FIG. 4 shows an alternative variation of the sending/receiving unit. Here, a material permeable by microwaves, preferably glass, is soldered, melted, or pressed into the waveguide jacket 413, which is connected a flange mounting flange 423, of a waveguide 411. This glass window 420 seals off the interior of the container from the outside and absorbs the container pressure. For better matching of the microwaves with the horn antenna, the taper 425, preferably of glass or ceramic, is attached to the waveguide jacket with a holding ring 427. A sealing ring 417 between holding ring 427 and shoulder 426 provides for pressure proofing against container pressures. This prevents the penetration of substances from the container interior into the separation between glass window 420 and taper 425.

The holding ring is welded to the waveguide jacket, and the waveguide jacket to the mounting flange. A waveguide 428 set on top delivers the microwave performance. Boron silicate is preferably used as material for the glass window. The length of the glass window should preferably be selected such that it forms a lambda/2-transformer.

Figure 5:
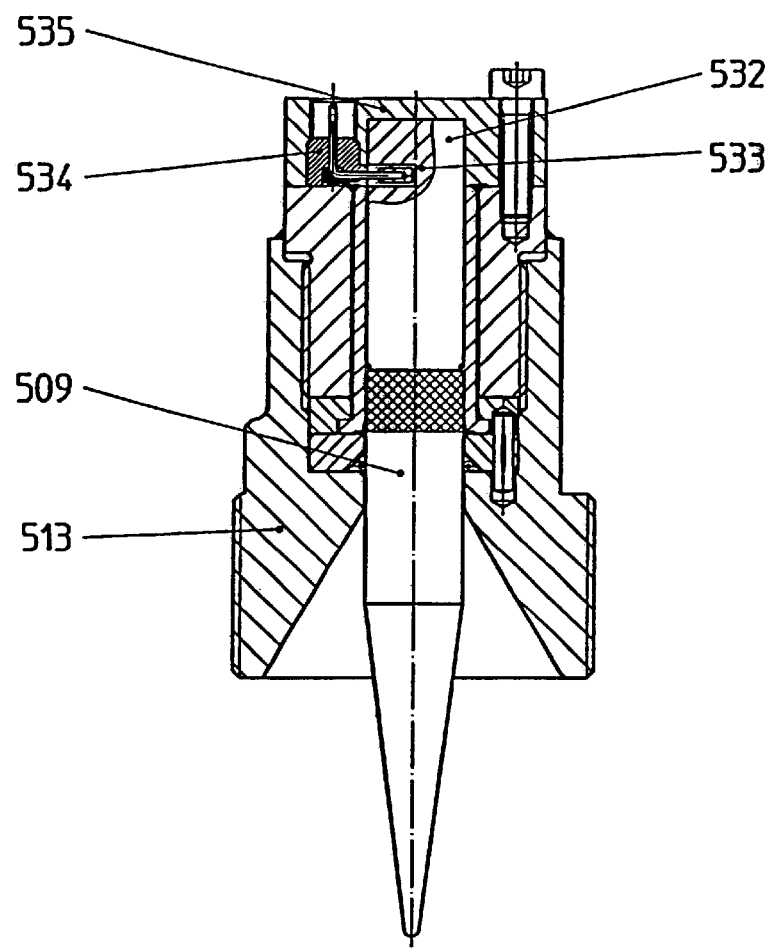
FIG. 5 shows a an embodiment of the invention providing for sidewise coupling of the exciter pin into the coupling piece of the taper.
Figure 5A:
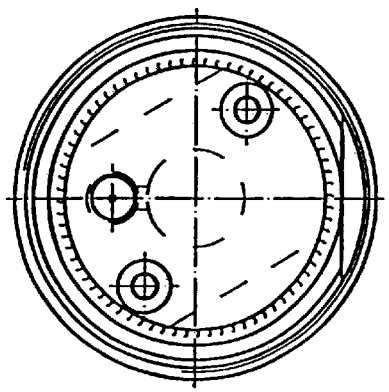
FIG. 5A is a bottom view of the FIG. 5 embodiment.

FIG. 5 shows a waveguide jacket 513 and the sidewise transmission of the microwave pulses into the coupling piece 532 of the waveguide filling 509. The coupling occurs via the exciter pin 533, which is put in sidewise position by a coaxial angle 534. For advantage, a cover 535 for covering the waveguide filling is provided.

Figure 6:
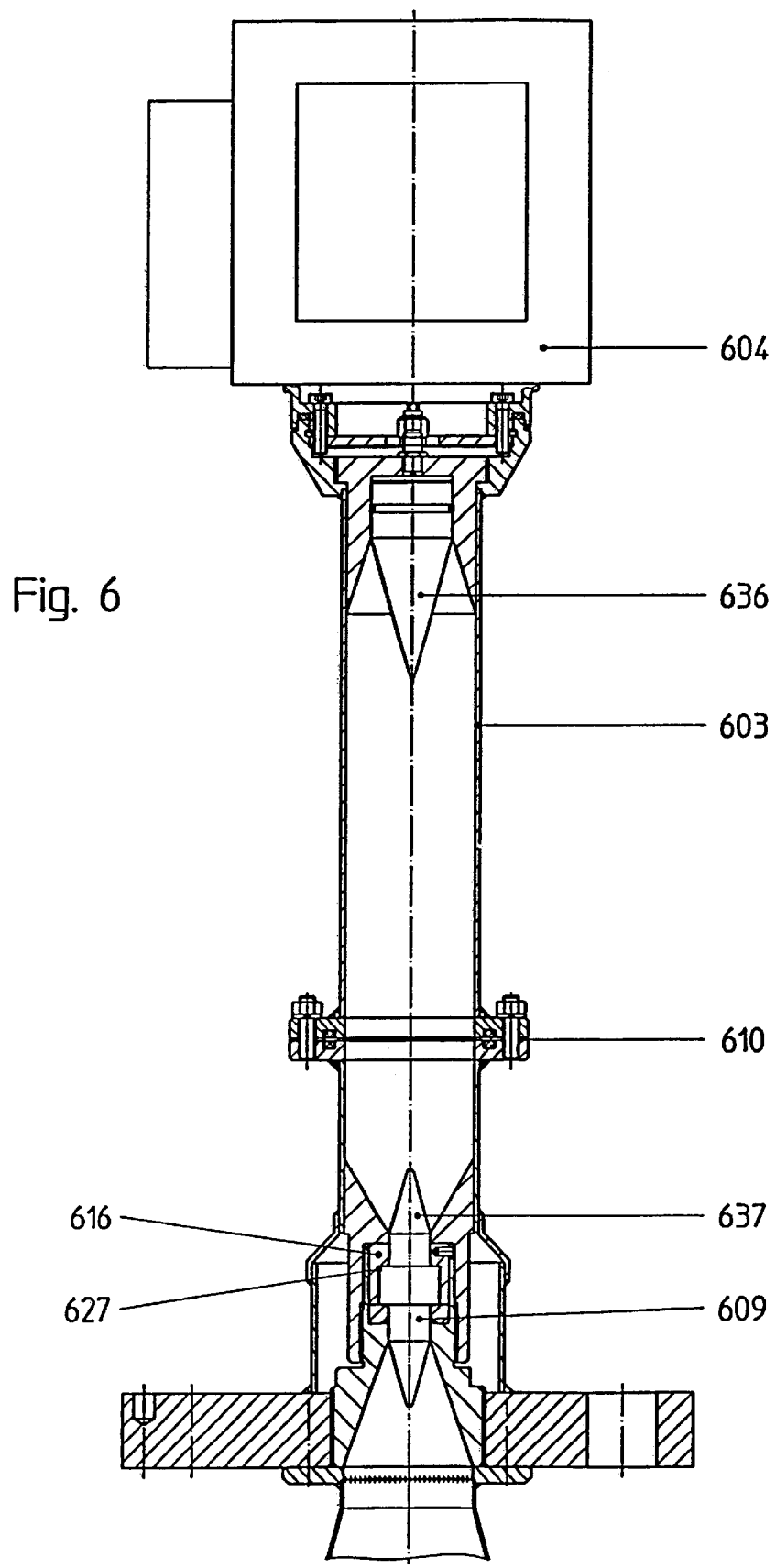
FIG. 6 shows a further alternative embodiment level measuring device with the spacer tube as a microwave waveguide.

FIG. 6 shows a further design version of the invented level measuring device, in which the spacer tube acts as air waveguide that replaces the electrical line for transmission of the microwave pulses radiating into the container between the electronic area 604 and the waveguide filling 609. The coupling of the microwaves into the waveguide filling occurs via a waveguide coupling 636, and the coupling of the microwaves transmitted in the waveguide into the sending/receiving part of the measuring device is achieved by a waveguide transition 637. For thermal shielding, a separating wall 610 permeable to microwaves, preferably of Teflon, can also be arranged in spacer tube 603. The container pressure is absorbed at the taper by a "lambda/2" enlargement of the waveguide filling, as shown in FIG. 3A and 3B. In respect to the attachment of the waveguide filling in the waveguide, this design version is not limited to such an enlargement of the waveguide filling.

Figure 7:
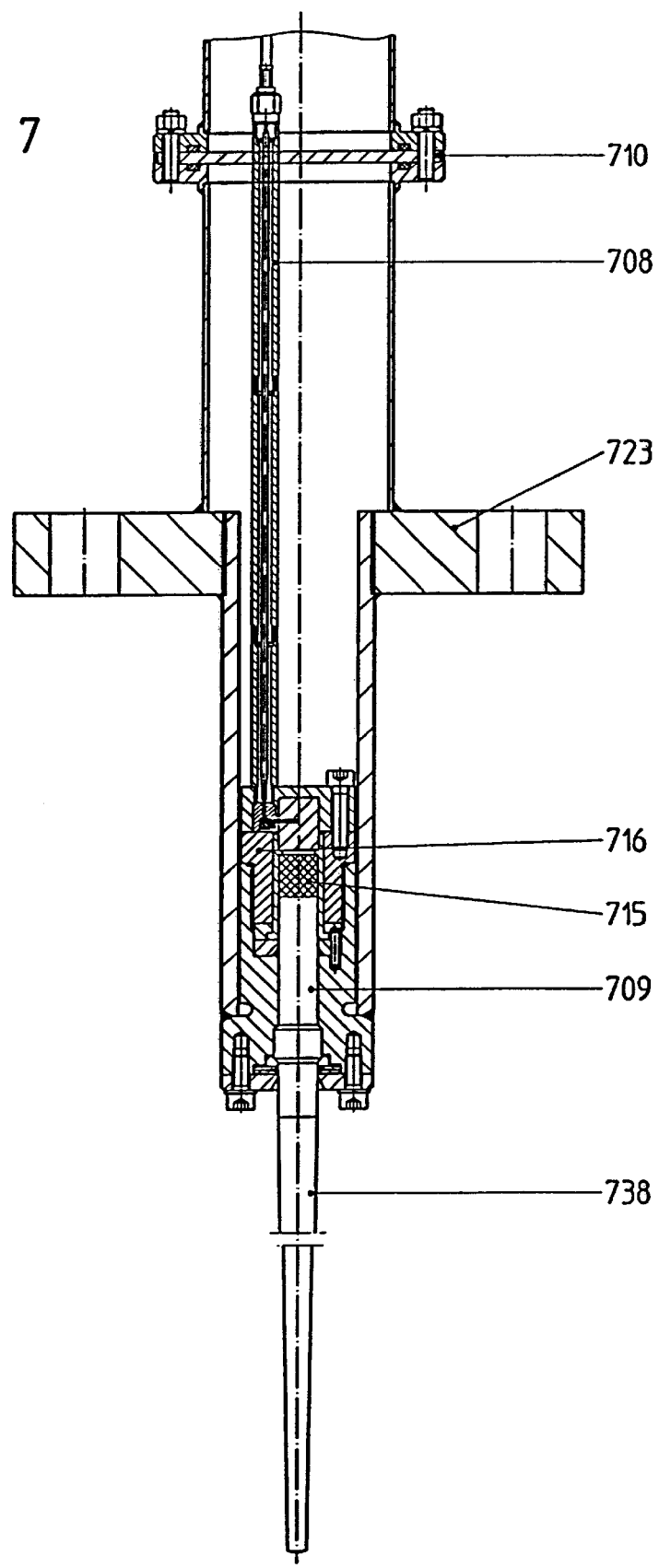
FIG. 7 shows a further alternative embodiment of the invented level measuring device, where a polyrod antenna is used rather than a horn antenna.

FIG. 7 shows a further design version of the invented level measuring device, in which the horn antenna of the prior design versions has been replaced by a polyrod antenna 738. Above the polyrod antenna 738 is waveguide filling 709, which is connected to coaxial line 708 through solder seam 715. Pressure screw 716 seals the solder seam. Mounting flange 723 is provided for connecting the device to environment (not shown). Separating wall 710 is provided in the spacer tube.

Devices for pressure absorption of the container pressure and for shielding of the high container temperatures, as well as chemically aggressive substances, correspond here to the previously described design versions. This design version is particularly suitable for measurements through small container openings.

What is claimed is:

1. A measuring device for measuring the level of a material contained within a container through a measurement opening in a wall thereof, comprising:
   a housing containing an electronics unit providing for the generation and sending of microwave signals and for receiving and measuring characteristics of received microwave signals;
   a sending/receiving unit for sending and receiving microwave signals;
   an electrical transmission line connecting the electronics unit and the sending/receiving unit for communicating microwave signals between the electronics unit and the sending/receiving unit;
   a mounting unit having a mounting flange attachable to the wall of the container and surrounding the measurement opening, the mounting unit supporting the sending/receiving unit in communication with the interior of the container for sending and receiving microwave signals through the measurement opening to and from the surface of the material;
   a spacer tube mounted between the housing containing the electronics unit and the sending/receiving unit; and
   a thermal barrier mounted in the spacer tube, the thermal barrier comprising at least one separation wall made from material of low thermal conductivity which divides the spacer tube into two consecutive sections between the electronics unit and the mounting unit.

2. The level measuring device of claim 1, wherein the thermal barrier includes Teflon.

3. The level measuring device of claim 1 wherein the sending/receiving unit comprises a waveguide, a waveguide filling media at least partially contained within the waveguide and an antenna horn.

4. The level measuring device of claim 3, wherein at least a portion of the electrical transmission line is an air insulated coaxial cable connected between the electronics unit and the waveguide filling media of the sending/receiving unit, the coaxial cable directly coupled into the waveguide filling medium.

5. The level measuring device of claim 4, wherein the air coaxial cable is placed between the separation wall and the sending/receiving unit.

6. The level measuring device of claim 3 wherein at least part of the waveguide filling media comprises heatproof material permeable by microwaves.

7. The level measuring device of claim 6 wherein the material comprises glass.

8. The level measuring device of claim 3, wherein the waveguide filling media includes an enlargement, which supports itself on a projection on the waveguide.

9. The level measuring device of claim 8, characterized in that the enlargement corresponds in axial length to half the wavelength of the conducted microwave signal.

10. The level measuring device of claim 9, wherein the transmission line couples a microwave into the waveguide filling occurs media from the side.

11. The measuring device of claim 3, wherein the transmission line extends through the thermal barrier such that the waveguide filling media does not extend through the thermal barrier.

12. The measuring device of claim 11, wherein the waveguide filling media is welded to the mounting flange.

13. The measuring device of claim 12, wherein the sealing materials are selected from one of pressure proof welding connections, metal seals, or graphite seals.

14. The measuring device of claim 13, wherein the sending/receiving unit includes a taper element at least partially enclosed within the horn antenna, and wherein the taper element is press-molded to a taper mounting portion of the waveguide.

15. The measuring device of claim 11, wherein the sending/receiving unit includes sealing materials for axially and/or radially sealing between the waveguide and the waveguide filling media or the waveguide and the mounting flange.

16. The measuring device of claim 11, wherein the sending/receiving unit includes a two-part sleeve, wherein the waveguide filling media is welded, soldered, or melted into the sleeve, wherein one part of the sleeve includes a material with a heat expansion coefficient commensurate to that of the waveguide, and the sleeve is sealingly connected to the wavegudie for a pressure proof seal.

17. The measuring device of claim 16, wherein the taper element is press-molded to the taper mounting portion using thermal or non-thermal press-molding.

18. The measuring device of claim 16, wherein the taper element is press-molded to the taper mounting portion at room temperature.

19. The measuring device of claim 16, wherein a portion of the taper element that is secured by press molding is surrounded by one at least one additional element, the at least one additional element having a lower heat expansion coefficient than the material of the waveguide.

20. The measuring device of claim 16, wherein the sending/receiving unit includes at least one additional element in the press-molded location between waveguide filling media and waveguide, whose material has a lower heat expansion coefficient than the material of the waveguide, the at least one additional element secures the press-molding of the waveguide filling media.

21. The measuring device of claim 20, wherein the enlargement corresponds in axial length to half the wavelength of a conducted microwave signal.

22. The measuring device of claim 11, wherein the waveguide filling media includes an enlargement, which supports itself on a projection of the waveguide.

23. The measuring device of claim 22, wherein the electrical transmission line couples into the waveguide filling medium occurs from a side.

24. The measuring device of claim 23, wherein a ratio of the area of the waveguide filling, media to the ratio of the increased area portion is a multiple of lambda/2 of the nominal signals used in the measurement device.

25. The measuring device of claim 11, wherein the waveguide filling media includes a taper element having an increased cross sectional area adjacent the distal end thereof which forms a pressure ridge for increasing the effectiveness of the seal between the waveguide filling media and the waveguide.

26. The level measuring device of claim 1, the spacer tube is an air filled waveguide.

27. The level measuring device of claim 26, wherein the waveguide includes at least one microwave permeable separation wall made from material of low heat conductivity which divides the waveguide between the electronics unit and the mounting unit into two consecutive sections.

28. The level measuring device of claim 1 wherein the sending/receiving unit comprises a waveguide, waveguide filling medium at least partially enclosed by the waveguide, and a thin polyrod antenna coupled to the waveguide filling medium.

29. The measuring device of claim 1, wherein the spacer tube functions as a waveguide for transmission of microwave signals from the proximal end adjacent to the electronics unit to the distal end adjacent to the waveguide sleeve.

30. The level measuring device of claim 1, wherein the spacer tube spatially and thermally isolates the electronics unit from the sending/receiving unit.

31. A mounting assembly for a sending/receiving unit of a microwave instrument for the measurement of the level of a material in a closed container having a measurement opening in a wall thereof, comprising:
   a mounting flange attachable to the wall of the container surrounding the measurement opening, the mounting flange having an aperture therethrough which is aligned in registration with the measurement hole when the flange is attached to the container wall;
   a microwave horn attached at a throat end thereof to a lower face of the mounting flange in registration with the aperture in the mounting flange, the body of the horn depending from the flange and projecting into the container through the measurement hole therein,
   a waveguide jacket having an internal bore opening therethrough along an axis thereof and having an external shape at one end thereof for axial insertion into the aperture of the mounting flange, the one end of the waveguide jacket and the one end of the microwave horn forming a pressure tight seal with the lower face of the mounting flange;
   a waveguide filling medium and taper element mounted in the internal bore opening of the waveguide jacket with the exterior walls of the waveguide filling medium sealingly engaging the internal bore opening of the waveguide jacket and the waveguide filling medium having the taper element depending therefrom and projecting below the mounting flange into throat of the microwave horn;
   a spacer tube attached to the mounting flange; and
   a thermal barrier in the spacer tube, the thermal barrier including at least one low thermal conductivity wall that divides the spacer tube into consecutive sections.

32. The assembly of claim 31 wherein the waveguide jacket is provided with a high pressure fluid tight seal to the mounting flange comprising:
   a pressure ring sealingly surrounding the body of the waveguide filling medium and taper element and forming a pressure tight seal between the waveguide jacket and the body of the waveguide filling medium and taper;
   a metal seal forming an annulus around the waveguide filling/taper element, the metal seal being engaged by the pressure ring which is above and adjacent it; and
   a pressure screw surrounds the waveguide filling/taper element and applies pressure to the pressure ring and the metal seal.

33. The assembly of claim 32 wherein the high pressure seal also includes:
   an annular disk surrounding the waveguide filling/taper above and engaging a top surface of the pressure ring, the annular disk constructed and arranged for arresting twisting of the pressure ring against the metal seal as pressure screw is advanced.

34. The assembly of claim 31 wherein the waveguide filling medium is soldered into a circumferential solder sleeve which engages the inner wall of waveguide jacket.

35. The assembly of claim 34 wherein a circumferentially disposed band of solder is applied to the waveguide filling element prior to assembly to facilitate forming the high pressure seal.

36. The assembly of claim 31 wherein the waveguide jacket has at least one portion thereof which is press-fit into a close bond with the waveguide filling medium and taper element.

37. The assembly of claim 31 wherein a ring of low thermal expansion material is slid over at least a portion of the waveguide sleeve to form a press fit for securing the sleeve to the waveguide filling medium and taper element.

38. The assembly of claim 31 wherein the waveguide filling medium and taper element have an increased cross section area adjacent the distal end thereof and wherein an inner waveguide sleeve of low thermal expansion material having an internal bore opening therethrough along an axis thereof engages the waveguide filling medium inserted in the internal bore thereof.

39. The assembly of claim 38 wherein a pressure ridge is provided between the inner waveguide sleeve and the waveguide sleeve to provide a tighter pressure seal.

40. The assembly of claim 31 wherein the waveguide filling medium and taper element have an increased cross sectional area adjacent the distal end thereof which forms a pressure ridge for increasing the effectiveness of the seal between the waveguide filler medium and the waveguide sleeve.

41. The assembly of claim 40 wherein the ratio of the area of the waveguide filling to the ratio of the increased area portion is a multiple of lambda/2 of the nominal signals used in the measurement device.

42. A measuring device for measuring the level of a material contained within a container through a measurement opening in a wall thereof, comprising:
a housing containing an electronics unit providing for the generation and sending of microwave signals and for receiving and measuring characteristics of received microwave signals;
a sending/receiving unit for sending and receiving microwave signals, the sending/receiving unit including a waveguide, a waveguide filling media at least partially contained in the waveguide and a horn antenna, wherein the waveguide filling media is welded, soldered, or sealingly melted into the waveguide for adherently securing the waveguide filling medium and the waveguide to the mounting flange thereby forming a pressure proof seal and for assuring that the container pressure impinges upon and is absorbed by the waveguide filling media;
an electrical transmission line connecting the electronics unit and the sending/receiving unit for communicating microwave signals between the electronics unit and the sending/receiving unit; and
a mounting unit having a mounting flange attachable to the wall of the container and surrounding the measurement opening, the mounting unit supporting the sending/receiving unit in communication with the interior of the container for sending and receiving microwave signals through the measurement opening to and from the surface of the material, the mounting unit also supporting the housing containing the electronics unit at a mounting location both spatially and thermally isolated from both the sending/receiving unit and the material within the container.

43. The level measuring device of claim 42, wherein the waveguide filling is welded to the mounting flange.

44. The level measuring device of claim 42, wherein the sending/receiving unit includes sealing materials arranged for axially and/or radially sealing between the waveguide and the waveguide filling media or the waveguide and the mounting flange.

45. The level measuring device of claim 44, wherein the sealing materials are selected from one of pressure proof welding connections, metal seals, or graphite seals.

46. The level measuring device of claim 42, wherein the sending/receiving unit includes a two-part sleeve, wherein the waveguide filling media is welded, soldered, or melted into the sleeve, wherein one part of the sleeve includes a material with a heat expansion coefficient commensurate to that of the waveguide, and the sleeve is sealingly connected to the waveguide for a pressure proof seal.

47. The level measuring device of claim 46, wherein the sending/receiving unit includes a taper element at least partially enclosed within the horn, and wherein the taper element is press-molded to a taper mounting portion of the waveguide jacket.

48. The level measuring device of claim 47, wherein the taper element is press-molded to the taper mounting portion using thermal or non-thermal press-molding.

49. The level measuring device of claim 47, wherein the taper element is press-molded to the taper mounting portion at room temperature.

50. The level measuring device of claim 47, wherein a portion of the taper element that is secured by press molding is surrounded by one at least one additional element, the at least one additional element having a lower heat expansion coefficient than the material of the waveguide.

51. The level measuring device of claim 47, wherein the sending/receiving unit includes at least one additional element in the press-molded location between waveguide filling media and waveguide, whose material has a lower heat expansion coefficient than the material of the waveguide, the at least one additional element secures the press-molding of the waveguide filling media.

52. The level measuring device of claim 51, wherein the enlargement corresponds in axial length to half the wavelength of a conducted microwave signal.

53. The level measuring device of claim 42, wherein the waveguide filling media includes an enlargement, which supports itself on a projection of the waveguide.

54. The level measuring device of claim 53, wherein the electrical transmission line couples into the waveguide filling medium occurs from a side.

55. A measuring device for measuring the level of a material contained within a container through a measurement opening in a wall thereof, comprising:
a housing including an electronics unit generating and receiving microwave signals and measuring characteristics of microwave signals;
a sending/receiving unit sending and receiving microwave signals to and from the material, the sending/receiving unit including a waveguide, a waveguide filling media at least partially contained in the waveguide and a horn antenna, wherein the waveguide filling media forms a pressure proof seal with the waveguide to assure that container pressure impinges upon and is absorbed by the waveguide filling media;

a transmission line connecting the electronics unit and the sending/receiving unit for communicating microwave signals between the electronics unit and the sending/receiving unit;

a mounting unit having a mounting flange attachable to the wall of the container and surrounding the measurement opening, the mounting unit supporting the sending/receiving unit in communication with the interior of the container for sending and receiving microwave signals through the measurement opening to and from the surface of the material;

a spacer tube mounted between the housing and the mounting unit; and a thermal barrier mounted in the spacer tube, the thermal barrier including at least one separation wall made from material of low thermal conductivity which divides the spacer tube into two consecutive sections between the electronics unit and the mounting unit for spatially and thermally isolating the electronics unit from the material.

56. A material measuring device, comprising:

an electronics unit adapted to generate and receive microwave signals;

a signal transmission line connected to electronics unit, the signal transmission line including an angle and an exciter pin;

a mounting unit connected to the electronics unit;

a sending and receiving unit connected to the mounting unit, the sending and receiving unit including an elongate waveguide filling, the exciter pin extending non-coaxially to the waveguide filling, wherein the mounting unit spatially and thermally isolates the electronics unit from the sending and receiving unit and includes a thermal barrier that thermally isolates the electronics unit from both the sending and receiving unit and a material to be measured.

* * * * *

UNITED STATES PATENT AND TRADEMARK OFFICE
CERTIFICATE OF CORRECTION

PATENT NO.   : 6,393,909 B1
DATED        : May 28, 2002
INVENTOR(S)  : Josef Fehrenbach, Jurgen Motzer, Jurgen Dietmeier and Gunter Rapp It is certified that error appears in the above-identified patent and that said Letters Patent is hereby corrected as shown below:

Title page,
Item [75], Inventors, please delete "Fahrenbach" and insert -- Fehrenbach --, therefor; and please delete "Motzar" and insert -- Motzer --, therefor.

Column 10,
Lines 62-63, delete "characterized in that" and insert -- wherein --, therefor.
Line 67, delete "occurs" after "filling".

Column 11,
Line 26, delete "wavegudie" and insert -- waveguide --, therefor.
Line 35, delete first instance of "one" between "by" and "at least one".
Line 55, delete "," after "filling".
Line 64, insert -- wherein -- between "claim 1," and "the spacer tube".

Column 12,
Lines 50 and 64, insert -- , -- before "wherein".

Column 13,
Lines 4, 7, 11, 15, 19, 26, 29 and 35, insert -- , -- before "wherein".

Column 14,
Line 35, delete first instance of "one" between "by" and "at least one".

Column 15,
Line 53, delete "occurs" after "medium".

Signed and Sealed this

Seventeenth Day of December, 2002

JAMES E. ROGAN
*Director of the United States Patent and Trademark Office*